UNITED STATES PATENT OFFICE.

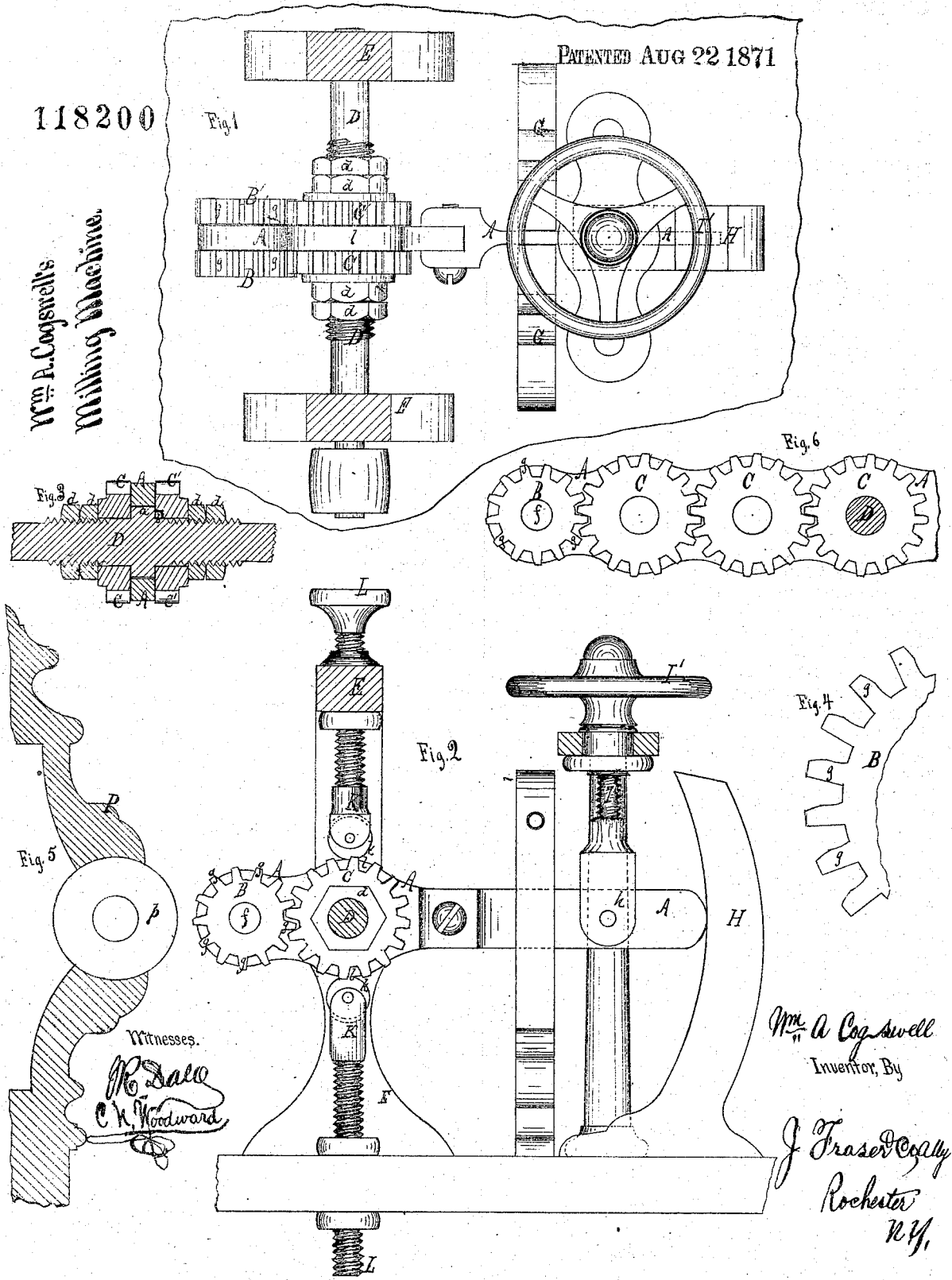

WILLIAM A. COGSWELL, OF ROCHESTER, NEW YORK, ASSIGNOR TO JUNIUS JUDSON, OF SAME PLACE.

IMPROVEMENT IN MACHINES FOR MILLING HEADS OF GOVERNOR-VALVES.

Specification forming part of Letters Patent No. 118,200, dated August 22, 1871.

*To all whom it may concern:*

Be it known that I, WILLIAM A. COGSWELL, of the city of Rochester, in the county of Monroe and State of New York, have invented certain new and useful Improvements in Machines for Milling the Heads of Governor-Valves for the Reception of the Arms, of which the following is a specification:

This invention relates to certain improvements in milling-machines; and it consists in arranging the cutters and gears upon a vertically-acting lever, which, acting in combination with certain other devices, admit the cutters to adapt themselves to the work to be milled or reamed out, all of which will hereinafter more fully be set forth.

In the drawing, Figure 1 is a plan view of the improved milling-machine. Fig. 2 is an elevation. Fig. 3 is a sectional view through the axis of the gears that give motion to the cutters. Fig. 4 is a view of the cutting-teeth, and Figs. 5 and 6 are detached views.

A represents the lever, upon which the cutters B B' and their gears C C' are mounted. The axis of the lever is a screw, D, which rests in arch E. This screw has a central head, $a$, on which the lever fits loosely. It also has a feather, $b$, which holds one of the gears, C', from slipping. The other gear, upon the opposite side, is clamped closely against the face of head $a$. These gears are tightened up by set-nuts $d\,d$ on opposite sides, as shown in Fig. 3. This arrangement allows a free turning of axis D and gears C C' without affecting the lever which rests thereon. The cutters or milling-wheels B B' are simply mounted on a stud, $f$, so as to turn easily at the front end of the lever. They engage with the gears C C', from which they receive motion. Their teeth $g$ $g$ are made square or sharp-edged in front, as shown in Fig. 4, so as to cut iron; but this does not interfere in the least with their engagement with the teeth of the gears. The long end of the lever, after passing through a guide-standard, G, rests in close contact with a stay-bar, H, bolted fast to the bed, and whose curve is struck from the axis of the lever. This stay-bar simply serves to prevent any end thrust of the lever, and keep it in place without bearing hard upon its axis, which is of much importance. To the rear end of the lever is pivoted, at $h$, a screw, I, having a hand-wheel, I', at the top by which the lever is raised or lowered, thereby raising or lowering the cutters. Friction-rollers $k\,k$, resting in standards or bearings K, are made to bear upon the circular axial portion $l$ of the lever, so as to steady and hold said axial portion in place as the lever turns. The bearings K K are adjusted higher or lower by means of hand-screws L L.

The head P, which is to be milled or reamed out, is held in a fixed position by any suitable clamp or vise, and is moved up so that the cutters B B' will rest in the slot $p$, which is to be dressed. The hand-wheel I' is now turned so as to either elevate or depress the cutters in the slot. When the upper or lower surface has been dressed the opposite is dressed without removing the cutters from place. The parts milled are the upper and lower concave surfaces of the slots, which cannot be easily reached by any other tool. These cutters, by being so perfectly under control, are operated with the greatest precision and ease, and the fit of the governor-arms therein is perfect, so that they may be applied indiscriminately, which could not be done by hand. This advantage results from mounting the cutters upon the lever A. Another advantage results from the mounting of the cutters at the end of the lever and making them of larger size than said end, and with no projections of journals or other parts. By this means the cutters may be passed into the slot a distance greater than their diameter, as they open their own way. In all other cutting devices with which I am acquainted the cutter can go only part way in, or up to the journal or axis on which it turns.

I contemplate as a modification of this arrangement the use of a series or train of gears, C C C, as shown in Fig. 6. This will give a great projection of the cutters, and enable them to enter a long or deep slot to mill it out.

The friction-rollers $k\,k$ and the stay-bar H are of importance in keeping the position of the cutters perfect while doing the work. The rollers hold the lever in place on its center without at all interfering with the turning of the axis by which the cutters receive motion. The stay-bar prevents end thrust.

I claim—

1. In a milling-machine, the combination of the lever A, cutters B B', gears C C', rotary shaft D, and adjustable bearing K K, arranged and operating substantially as described, for the purpose specified.

2. In a milling-machine, the combination of the lever A, cutters B B', gears C C', shaft D, bearings K K, and friction-rollers k k, arranged and operating substantially as and for the purpose set forth.

3. In a milling-machine, the combination of the lever A and adjusting mechanism I I' h, cutters B B', gears C C', rotary shaft D, and adjustable bearings K K, substantially as and for the purpose specified.

4. In a milling-machine, the combination of the circular stay-bar H, lever A, cutters B B', gears C C', rotary shaft D, and adjustable bearings K K, arranged and operating substantially as and for the purpose specified.

In witness whereof I have hereunto set my hand this 1st day of April, 1871.

WM. A. COGSWELL.

Witnesses:
 R. F. OSGOOD,
 ARCHIE BAINE.